(12) United States Patent
Takacs et al.

(10) Patent No.: US 12,159,545 B2
(45) Date of Patent: Dec. 3, 2024

(54) AIR TRAFFIC DEPICTION FOR PORTABLE AND INSTALLED AIRCRAFT DISPLAYS

(71) Applicant: Lockheed Martin Corporation, Bethesda, MD (US)

(72) Inventors: Robert S. Takacs, Oxford, CT (US); Simon J. Gharibian, Madison, CT (US); Roderick S. Duplin, Downington, PA (US); Octavian Codreanu, Thorndale, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 364 days.

(21) Appl. No.: 17/481,780

(22) Filed: Sep. 22, 2021

(65) Prior Publication Data
US 2023/0103832 A1    Apr. 6, 2023

(51) Int. Cl.
*G08G 5/00* (2006.01)
*B64D 43/02* (2006.01)
*G06F 3/0481* (2022.01)

(52) U.S. Cl.
CPC .......... *G08G 5/0078* (2013.01); *B64D 43/02* (2013.01); *G06F 3/0481* (2013.01);
(Continued)

(58) Field of Classification Search
CPC ....... B64D 43/02; B64D 43/00; G06F 3/0481; G06F 2203/04804; G06F 2203/04806;
(Continued)

(56) References Cited

U.S. PATENT DOCUMENTS

| | | |
|---|---|---|
| 6,512,529 B1 * | 1/2003 | Janssen .................. G06F 9/451 715/837 |
| 8,160,755 B2 | 4/2012 | Nichols et al. |

(Continued)

OTHER PUBLICATIONS

Federal Aviation Administration (FAA), "Order JO 7110.126A—Consolidated Wake Turbulence (CWT) Separation Standards," 2019, pp. 1-20 (Year: 2019).*

(Continued)

*Primary Examiner* — Abby Y Lin
*Assistant Examiner* — Karston G. Evans
(74) *Attorney, Agent, or Firm* — Michael Best & Friedrich LLP

(57) ABSTRACT

Systems and methods for depicting aircraft traffic. One example system includes an electronic controller coupled to a transceiver and a display for displaying a traffic interface. The electronic controller is configured to provide, on the traffic interface, a map representing a travel area and to provide, on the map, a first graphical representation of a first aircraft within the travel area. The electronic controller is configured to provide, on the map, a second graphical representation of a second aircraft within the travel area and to receive, from the transceiver, a first location of the first aircraft. The electronic controller is configured to receive, from the transceiver, a second location of the second aircraft and, in response to determining that the second location is within a predetermined radius of the first location, transform the traffic interface to highlight a geometric area of the map based on the first location.

17 Claims, 9 Drawing Sheets

(52) U.S. Cl.
CPC ......... *G08G 5/0008* (2013.01); *G08G 5/0021* (2013.01); *G08G 5/003* (2013.01); *G06F 2203/04804* (2013.01); *G06F 2203/04806* (2013.01)

(58) Field of Classification Search
CPC .... G08G 5/0008; G08G 5/0021; G08G 5/003; G08G 5/0078; G08G 5/0052; G01C 23/00; G01C 21/20
See application file for complete search history.

(56) References Cited

U.S. PATENT DOCUMENTS

| | | | | |
|---|---|---|---|---|
| 8,230,355 | B1* | 7/2012 | Bauermeister | G06F 3/04817 715/765 |
| 9,405,005 | B1* | 8/2016 | Arteaga | G08G 5/0021 |
| 9,478,140 | B2 | 10/2016 | Kathirvel | |
| 10,490,089 | B2 | 11/2019 | Khatwa et al. | |
| 2008/0125962 | A1* | 5/2008 | Wipplinger | G08G 5/0021 701/533 |
| 2012/0182161 | A1* | 7/2012 | Rutherford | G08G 5/0052 340/945 |
| 2013/0102279 | A1* | 4/2013 | Lee | H04M 1/72469 455/410 |
| 2013/0268885 | A1* | 10/2013 | Lim | G06F 3/04817 715/846 |
| 2017/0103660 | A1 | 4/2017 | Shafaat et al. | |
| 2019/0371183 | A1 | 12/2019 | Mecklem et al. | |
| 2020/0202732 | A1* | 6/2020 | Mecklem | G08G 5/0078 |
| 2020/0251002 | A1* | 8/2020 | Balasubramanian | G08G 5/0021 |
| 2020/0320887 | A1* | 10/2020 | Duan | G08G 5/0021 |
| 2022/0315027 | A1* | 10/2022 | Behring | B60K 35/00 |

OTHER PUBLICATIONS

European Patent Office Partial European Search Report for applicaton 22194511.6, dated Feb. 21, 2023 (12 pages).

Anonymous: "Air Traffic Display", Jun. 2, 2021, Retrived from the Internet: URL:https://web.archive.org/web/20210602164605/https://www.craggyaero.com/air_traffic_display.htm (retrieved on May 4, 2023) (4 pages).

European Patent Office Extended European Search Report for application 22194511.6, dated May 23, 2023 (12 pages).

* cited by examiner

AIR TRAFFIC DEPICTION FOR PORTABLE AND INSTALLED AIRCRAFT DISPLAYS

FIELD

Embodiments described herein relate to user interfaces for depicting aircraft and, more particularly, to systems and methods for enhanced air traffic depiction within user interfaces displayed via portable and installed aircraft displays.

SUMMARY

Traditional air traffic displays provided for use by operators of an aircraft depict air traffic against a dark or monochrome background. However, simply displaying the location of other aircraft relative to the operator's aircraft without real-world context fails to provide situational awareness, as the operator may have no point of reference as to where the other aircraft depictions are in the real world. To try and resolve this lack of situational awareness, some air traffic displays implement "moving maps," which are maps of an area surrounding the aircraft shown on the air traffic display along with depictions of other aircraft relative to the map. The moving maps move on the air traffic display relative to the depiction of the operator's aircraft, which provides a constant view of a location of the operator's aircraft and other aircraft relative to the surrounding area. However, some aircraft depictions on these air traffic displays may be difficult to see against the background clutter of the moving map. One possible approach to resolve this problem includes replacing the background map with a monochrome background when air traffic is detected entering within a predetermined radius of the ownship. However, this leads back to a reduction in situational awareness.

Additionally, traditional aircraft use communication signals sent and received by a radio wave transceiver to detect and identify air traffic within a radius of an ownship (i.e., an aircraft on which the air traffic display is displayed). The communication signals are used to determine the location of air traffic and depict the air traffic on the ownship display. The communication signals, however, may be lost by the ownship for any number of reasons, such as a traffic aircraft leaving a detection radius of the ownship, an operator of a traffic aircraft switching off their transceiver, or the transceiver of a traffic aircraft becoming inoperable for some other reason. When a communication signal is lost by the ownship, traditional applications may freeze the corresponding icon in place until the communication signal returns or remove the corresponding icon from the map entirely. In either case, this causes the operator of the ownship to lose awareness of the position of the aircraft.

DETAILED DESCRIPTION

Figure 1:
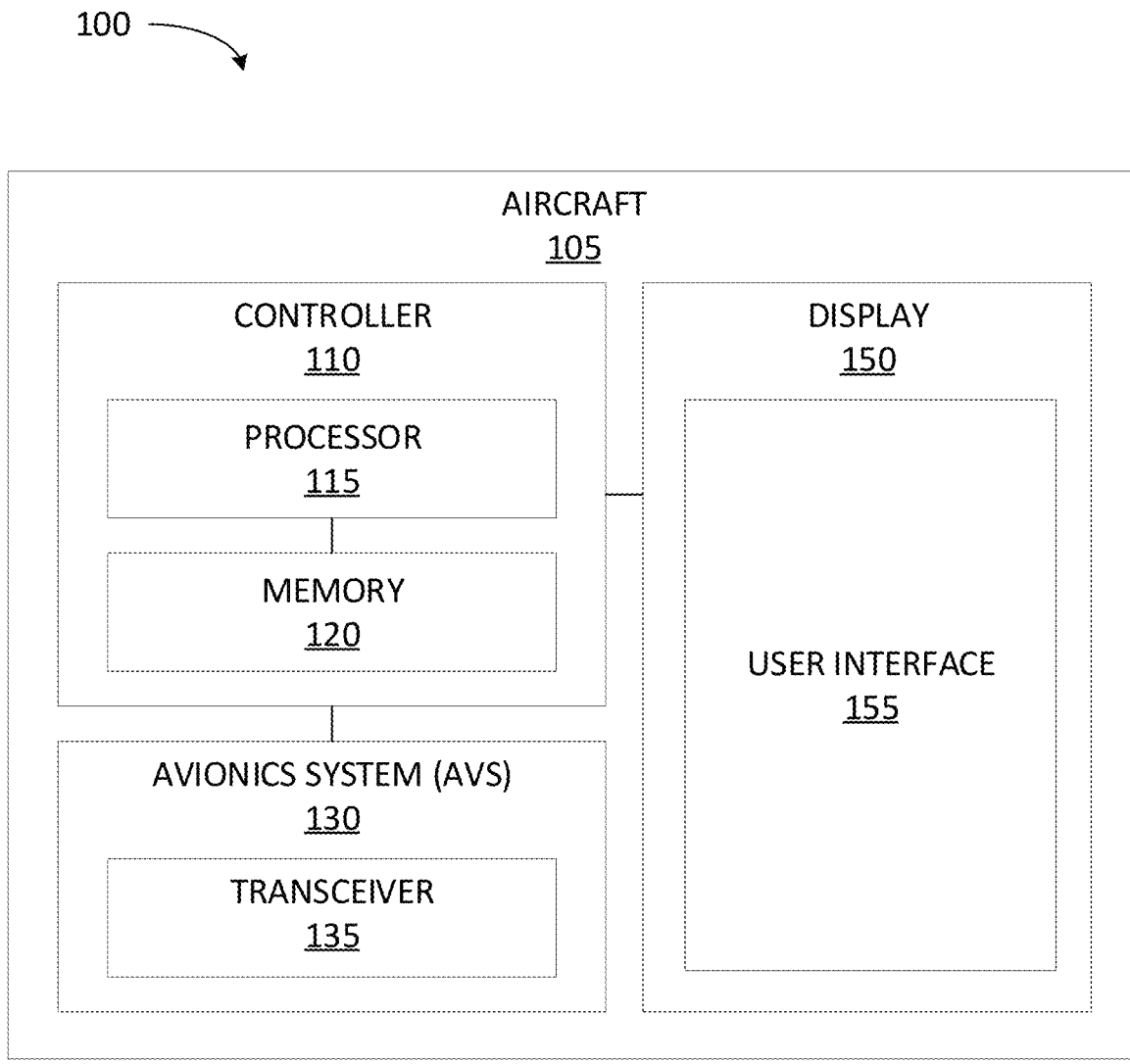
FIG. 1 schematically illustrates an aircraft system with enhanced aircraft depiction capabilities, according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Traditional air traffic displays provided for use by operators of an aircraft typically depict air traffic against a dark or monochrome background. However, this approach can impair an operator's situational awareness by failing to display ground reference points. One approach to solving this problem, used by some electronic flight bag (EFB) applications, is the use of "moving maps," maps of an area surrounding the aircraft that are shown on the air traffic display along with depictions of other aircraft relative to the map. The moving maps are capable of moving on the air traffic display relative to the depiction of the operator's aircraft, to give a constant view of a location of the operator's aircraft and other aircraft relative to the surrounding area. With the advent of moving maps, some EFB applications included icons representing air traffic superimposed over a map of a travel area to try and resolve this lack of situational awareness. However, this approach can lead to further problems.

In an EFB application with a moving map, the aircraft depictions may be difficult to see against the background clutter of the moving map. For example, air traffic that are within a predetermined radius of an ownship are generally depicted on the map using yellow icons. However, background maps may include yellow portions representing geographical features, such as cities. The yellow icons may blend into the yellow portions of the map, potentially leading to an operator of the ownship being unable to see the air traffic represented by the yellow icons. Some EFB applications attempt to resolve this problem by replacing the background map with a monochrome background air traffic is detected entering within a predetermined radius of the ownship. However, this reintroduces the monochrome map-related reduction in situational awareness that the moving maps were meant to address.

Additionally, traditional aircraft use communication signals sent and received by a radio wave transceiver to detect and identify air traffic within a radius of an ownship. The sent and received communication signals are used by the EFB application to determine the locations of air traffic and depict the air traffic on the ownship display. However, the communication signals may be lost by the ownship for any number of reasons. For example, a traffic aircraft may move out of range of the ownship, a transceiver of a traffic aircraft may cease functioning, or a communication signal of a traffic aircraft may become blocked for some reason. When a communication signal is lost by the ownship, some traditional EFB applications may freeze the corresponding icon in place until the communication signal returns or remove the corresponding icon from the map entirely. In either case, the operator of the ownship may lose awareness of the position of the air traffic.

While flying in an area with traffic, an operator of an aircraft may need to rapidly shift focus in and out of the cockpit. The operator may need to quickly identify icons relating to air traffic on an EFB application display, and then locate the corresponding aircraft outside of the cockpit by identifying landmarks given on a map of the EFB application. Additionally, the operator may need to be aware of air traffic aircraft whose communication signals may have been lost. Current solutions do not meet these needs and can create additional problems, such as a lack of awareness of the travel area, or a lack of awareness of aircraft whose communication signals have been lost.

Embodiments described herein provide systems and methods for creating an EFB application and a user interface for the same that provides operators of an aircraft up-to-date air traffic information while retaining awareness of the aircraft's surroundings. To accomplish this, embodiments described herein provide a travel map depicting air traffic, with the ability to highlight an area around an ownship when traffic aircraft enter within a predetermined radius of the ownship. The highlighted area may be partially transparent, to allow for a user to view the area of the travel map behind the highlighted area. Allowing a user to see the surrounding area on the travel map while also being able to quickly identify air traffic within the surrounding area improves the user's situational awareness. Additionally, embodiments described herein provide a travel map which retains icons of air traffic aircraft whose communication signals have been lost by fading the icon out based on a time since the communication signal was lost (also known as "ghosting"). Ghosting the icon allows for both the user to view an anticipated flight path of the air traffic aircraft and identify how long it has been since the signal was lost, and thus provide the operator with a sense of how reliable the signal is. This similarly improves situational awareness by allowing the user to quickly identify any air traffic that may enter the surrounding area of the user's aircraft.

In particular, one embodiment provides a method of depicting air traffic on an electronic display. The method includes providing on the electronic display, with an electronic processor, a map representing a travel area. The method includes providing on the map, with the electronic processor, a first graphical representation of a first aircraft within the travel area. The method includes providing on the map, with the electronic processor, a second graphical representation of a second aircraft within the travel area. The method includes receiving, with the electronic processor, a first location of the first aircraft. The method includes receiving, with the electronic processor, a second location of the second aircraft. The method includes, in response to determining that the second location is within a predetermined radius of the first location, highlighting, with the electronic processor, a geometric area of the map based on the first location.

Another embodiment provides a graphical user interface for depicting air traffic. a map representing a travel area. The graphical user interface includes a first graphical representation of a first aircraft within the travel area, the first graphical representation displayed on the map. The graphical user interface includes a second graphical representation of a second aircraft within the travel area, the second graphical representation displayed on the map. The graphical user interface includes a highlighted geometric area based on a first location of the first aircraft, the highlighted geometric area displayed on the map. In the graphical user interface, the highlighted geometric area is displayed on the map when a second location of the second aircraft is determined to be within a predetermined radius of the first location.

Yet another embodiment provides a system for depicting traffic on a traffic interface. The system includes a controller including an electronic processor, a display for displaying the traffic interface, and a transceiver communicatively coupled to the controller. The display is also communicatively coupled to the controller. The electronic controller is configured to provide, on the traffic interface, a map representing a travel area. The electronic controller is configured to provide, on the map, a first graphical representation of a first aircraft within the travel area. The electronic controller is configured to provide, on the map, a second graphical representation of a second aircraft within the travel area. The electronic controller is configured to receive, from the transceiver, a first location of the first aircraft. The electronic controller is configured to receive, from the transceiver, a second location of the second aircraft. The electronic controller is configured to, in response to determining that the second location is within a predetermined radius of the first location, transform the traffic interface to highlight a geometric area of the map based on the first location.

Figure 2:
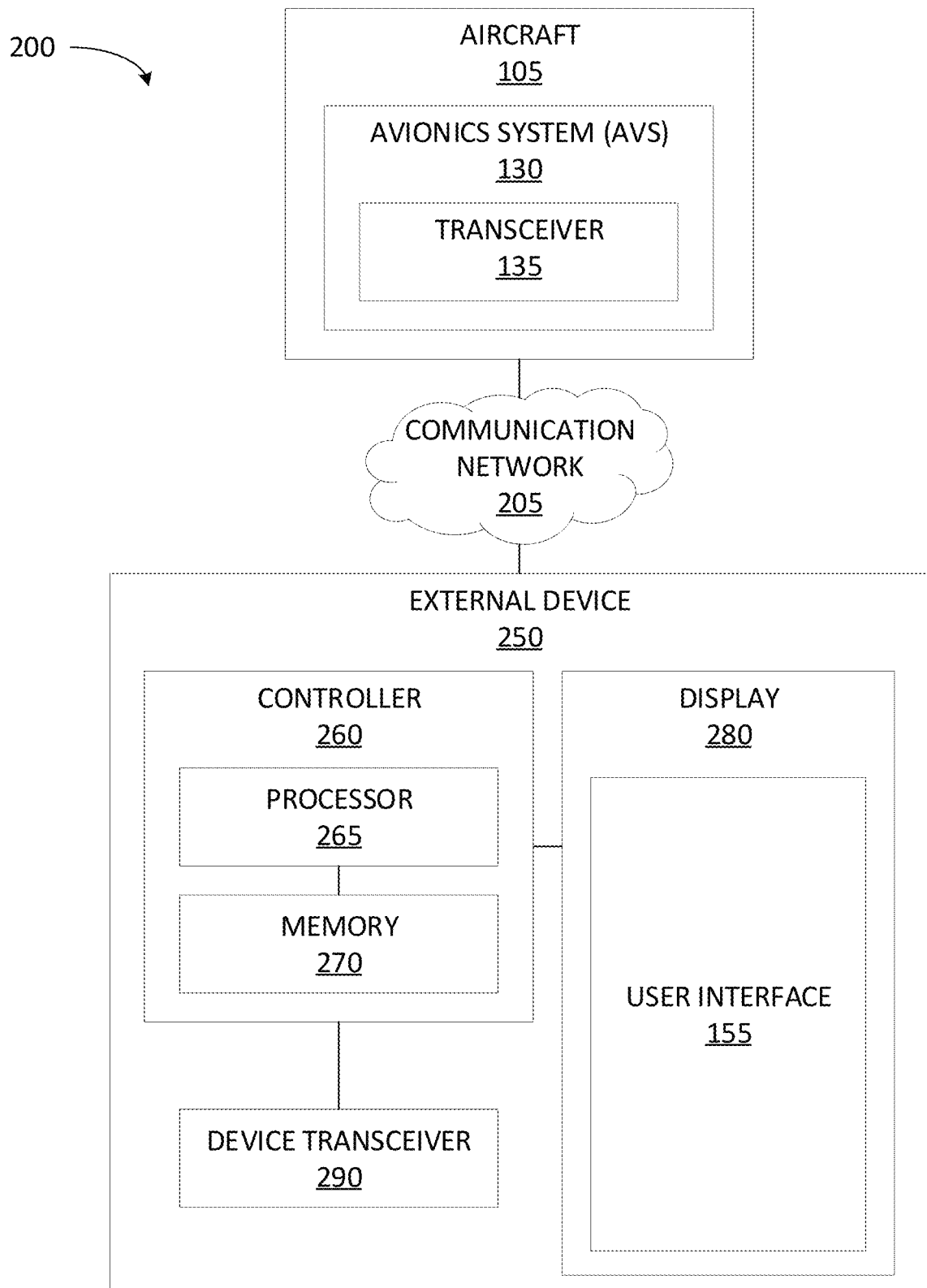
FIG. 2 schematically illustrates an alternative aircraft system with enhanced aircraft depiction capabilities, according to some embodiments.

FIG. 1 illustrates a system 100 for providing an enhanced EFB application. According to the embodiment illustrated in FIG. 1, the system 100 is integrated into an aircraft 105. Other embodiments, such as the embodiment illustrated in FIG. 2, are also possible. Returning to FIG. 1, the aircraft 105 includes a controller 110, an avionics system (AVS) 130, and a display 150. The AVS 130 and display 150 may be electrically, mechanically, and/or communicatively coupled to the controller 110. The controller 110 is an electronic controller, which may include an electronic processor 115 and a memory 120. The memory 120 may be a non-transitory computer-readable memory. The memory 120 may include one or more types of memory storage, such as random-access memory (RAM), flash memory, solid-state memory, or hard-drive memory. In addition, or alternatively, the controller 110 may communicate with a cloud-based storage system.

The AVS 130 includes a transceiver 135. The transceiver 135 is configured to send and receive communication signals to and from other aircraft. The communication signals may assist the aircraft 105 in identifying the location and navigational information of other aircraft, such as heading and speed. In addition, the communication signals may relay the location and navigational information of the aircraft 105 to other aircraft. In some embodiments, the AVS 130 may include further systems, including, but not limited to, navigational systems, monitoring systems, aircraft flight-control systems, fuel systems, collision-avoidance systems, flight recorders, weather systems, and aircraft management systems. In some embodiments, the aircraft 105 may not receive location and navigational information of other aircraft from the AVS 130. Instead, the aircraft 105 may receive location and navigational information of other aircraft from a control tower, an automatic identification system (AIS), a cloud-based server, or the like.

In some embodiments, such as the embodiment illustrated in FIG. 1, the display 150 is integrated into the aircraft 105. For example, the display 150 may be electrically coupled to the controller 110, coupled to an instrument panel of the aircraft 105, or included in the AVS 130. In all embodiments, the display 150 provides a user interface 155 for an EFB application. In some embodiments, the display 150 include user input capabilities, such as a touch screen.

FIG. 2 illustrates an alternative system 200 for providing an enhanced EFB application. Unlike the system 100 illustrated in FIG. 1, the system 200 of FIG. 2 illustrates a distributed configuration. The system 200 may include the aircraft 105, AVS 130, and transceiver 135 of the system 100 of FIG. 1. The system 200 further includes a communication network 205. The communication network 205 may be a Wi-Fi network, a cellular network, a Bluetooth network, or the like. The communication network 205 provides communicative coupling between the aircraft 105 and an external device 250. The external device 250 may be a mobile device, such as a smart phone, a tablet computer, a laptop computer, or the like. In some embodiments, the external device 250 is located within the aircraft 105. In other embodiments, the external device 250 is located external to the aircraft 105, for example in a control tower.

The external device 250 includes a controller 260, a display 280, and a device transceiver 290. The device transceiver 290 and display 280 may be electrically, mechanically, and/or communicatively coupled to the controller 260. The controller 260 is an electronic controller, which may include an electronic processor 265 and a memory 270. The memory 270 may be a non-transitory computer-readable memory. The memory 270 may include one or more types of memory storage, such as random-access memory (RAM), flash memory, solid-state memory, or hard-drive memory. In addition, or alternatively, the controller 260 may communicate with a cloud-based storage system. The device transceiver 290 is configured to send and receive communication signals to the aircraft 105 via the communication network 205. In some embodiments, the device transceiver 290 may additionally receive location and navigational information of other aircraft.

In some embodiments, such as the embodiment illustrated in FIG. 2, the display 280 is integrated into the external device 250 and is communicatively but not electrically or mechanically coupled to the aircraft 105. For example, the display 280 may be electrically and communicatively coupled to a mobile device, such as a smart phone or tablet computer. In all embodiments, the display 280 provides a user interface 155 for an EFB application. In some embodiments, the display 280 includes user input capabilities, such as a touch screen. Furthermore, other embodiments than the system 100 shown in FIG. 1 and the system 200 shown in FIG. 2 are possible. For example, some embodiments may distribute the components of the system 100 or 200 across multiple devices.

Figure 3:
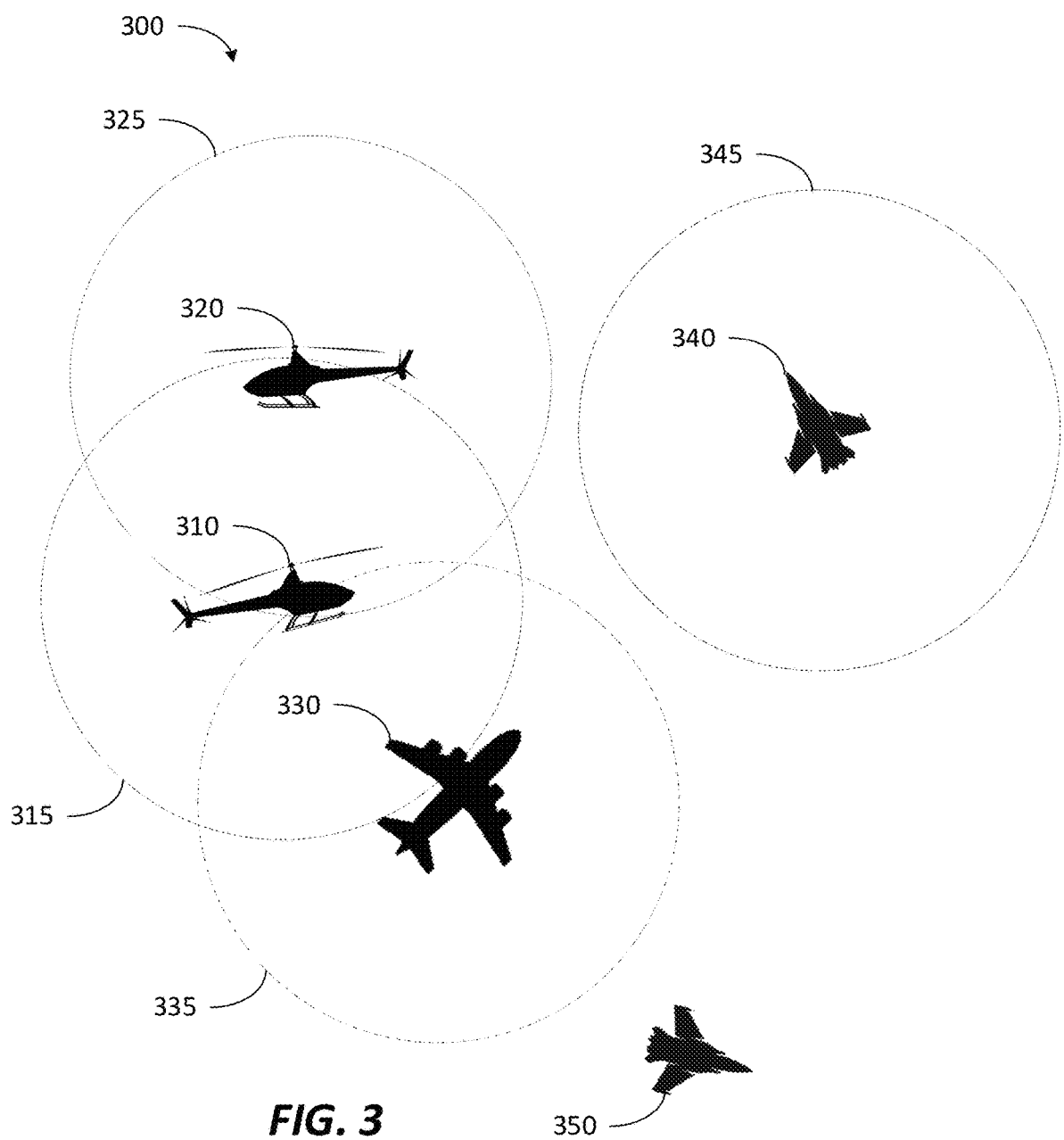
FIG. 3 illustrates a communication network between a plurality of aircraft, according to some embodiments.

FIG. 3 illustrates a communication network between a plurality of aircraft 300. The plurality of aircraft 300 includes a first aircraft 310 and at least a second aircraft 320. The plurality of aircraft 300 may include any number of aircraft beyond the second aircraft 320. For example, as illustrated in FIG. 3, the plurality of aircraft 300 includes a third aircraft 330, a fourth aircraft 340, and a fifth aircraft 350. The plurality of aircraft 300 may include different types of aircraft. For example, as illustrated in FIG. 3, the first aircraft 310 and the second aircraft 320 are helicopters, the third aircraft 330 is a passenger jet, and the fourth aircraft 340 and the fifth aircraft 350 are fighter jets. Each aircraft of the plurality of aircraft 300 may be equipped with an AVS 130 as described above. The transceiver 135 of the AVS 130 may be configured to send and receive communication signals to detect other aircraft that come within a predetermined radius of the corresponding aircraft.

As illustrated in FIG. 3, the first aircraft 310 includes a first aircraft detection radius 315. The first aircraft detection radius 315 represents an area in which the first aircraft 310 can send and receive communication signals corresponding to location and navigational data of the first aircraft 310 and other aircraft of the plurality of aircraft 300. In some embodiments, the first aircraft detection radius 315 may be a maximum range of a transceiver 135 of the first aircraft 310. In other embodiments, the first aircraft detection radius 315 may be a predetermined radius set by an operator of the first aircraft 310 (e.g., 10 nautical miles). Each of the aircraft of the plurality of aircraft may include a similar aircraft detection radius. For example, as illustrated FIG. 3, the second aircraft 320 has a second aircraft detection radius 325, the third aircraft 330 has a third aircraft detection radius 335, and the fourth aircraft 340 has a fourth aircraft detection radius 345. The fifth aircraft 350 does not include an aircraft detection radius. For example, the fifth aircraft 350 may have its transceiver 135 switched off or broken.

According to the communication network illustrated in FIG. 3, not each aircraft of the plurality of aircraft 300 can detect other aircraft of the plurality of aircraft 300. For example, the first aircraft 310 is within range of the second aircraft 320 and the third aircraft 330, as illustrated by the second aircraft detection radius 325 and the third aircraft detection radius 335 overlapping the first aircraft 310. Therefore, the first aircraft 310 can detect a position of the second aircraft 320 and the third aircraft 330 based on information received by corresponding communication signals. The second aircraft 320 is only within range of the first aircraft 310, and therefore can only detect a position of the first aircraft 310. Similarly, the third aircraft 330 is only within range of the first aircraft 310, and therefore can only detect a position of the first aircraft 310. The fourth aircraft 340 is out of range of all other aircraft of the plurality of aircraft 300, and therefore cannot detect the position of any other aircraft. The fifth aircraft 350 is similarly out of range of all other aircraft of the plurality of aircraft 300, and in addition does not include an aircraft detection radius.

Figure 4:
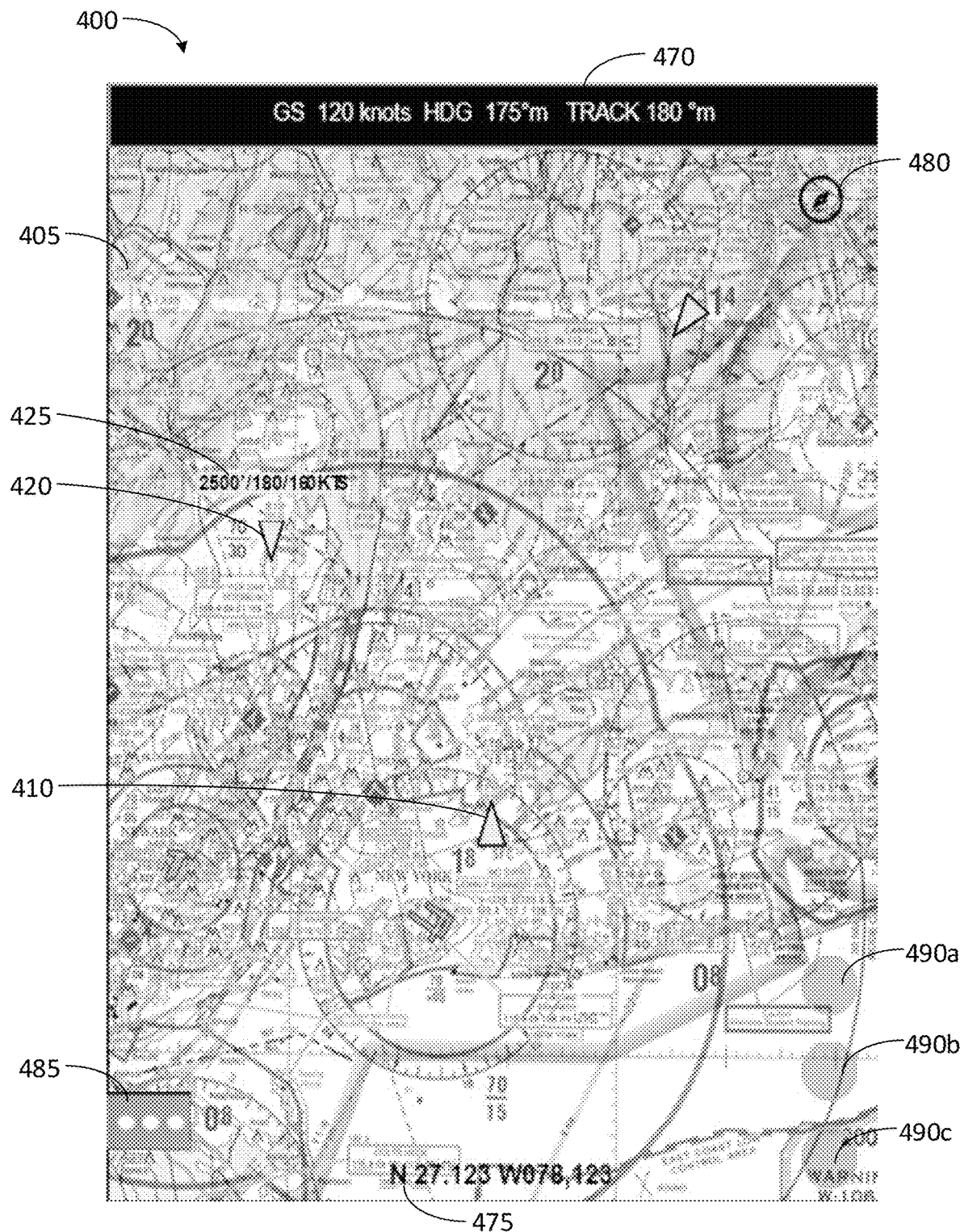
FIG. 4 is an example user interface for depicting air traffic on an air traffic map, according to some embodiments.

FIG. 4 illustrates a first example user interface 400 generated by the system 100 of FIG. 1 or the system 200 of FIG. 2. The user interface includes a map 405 representing a travel area. A first graphical representation 410 of a first aircraft may be displayed on the user interface 400, superimposed over the map 405. The first graphical representation 410 and any other graphical representation may be a representation provided on the user interface 400 of an object within the travel area. A graphical representation may have characteristics that identify a corresponding object. The graphical representation may be an icon, a shape, or a picture that represents a type of object. For example, the graphical representation may be a triangle when representing an aircraft. The graphical representation may also have other characteristics such as a size or a color that correspond to the object. For example, the graphical representation may change color based on distance from the first aircraft. In some embodiments, the first aircraft is an ownship (i.e., the first aircraft is operated by a user of the user interface 400).

The user interface 400 may also include a second graphical representation 420 of a second aircraft. The second graphical representation 420 may be a different color than the first graphical representation 410. The second graphical representation 420 may include navigational information of the second aircraft 425. The navigational information of the second aircraft 425 may include an altitude of the second aircraft, a heading of the second aircraft, and/or a speed of the second aircraft. In different embodiments, no graphical representations, some graphical representations, or all graphical representations may include navigational information. In some embodiments, the user interface 400 may be configured to generate navigational information about an aircraft in response to a selection of the corresponding graphical representation.

The user interface 400 may also include navigational information of the first aircraft 470. The navigational information of the first aircraft 470 may include, for example, an altitude of the first aircraft, a heading of the first aircraft, and/or a speed of the first aircraft. The user interface 400 may also include coordinate data of the first aircraft 475. The coordinate data of the first aircraft 475 may represent a current position of the first aircraft. The user interface 400 may also include a compass 480. The user interface 400 may also include a menu button 485. In some embodiments, the menu button 485 may provide the user with one or more additional functionalities of the user interface 400. The user interface 400 may also include one or more zoom buttons 490*a*-490*c*. In some embodiments, the zoom buttons 490*a*-490*c* may be used to adjust (i.e., incrementally increase or decrease) a zoom level of the map 405. For example, a first zoom button 490*a* may increase a zoom level of the map 405, a second zoom button 490*b* may return the map 405 to a predetermined zoom level, and a third zoom button 490*c* may decrease a zoom level of the map 405. In other embodiments, the zoom buttons 490*a*-490*c* may be used to set a zoom level of the map 405 to different predetermined levels. For example, the first zoom button 490*a* may set the zoom level of the map 405 to a first predetermined zoom level, the second zoom button 490*b* may set the zoom level of the map 405 to a second predetermined zoom level, and the third zoom button 490*c* may set the zoom level of the map 405 to a third predetermined zoom level.

Figure 5:
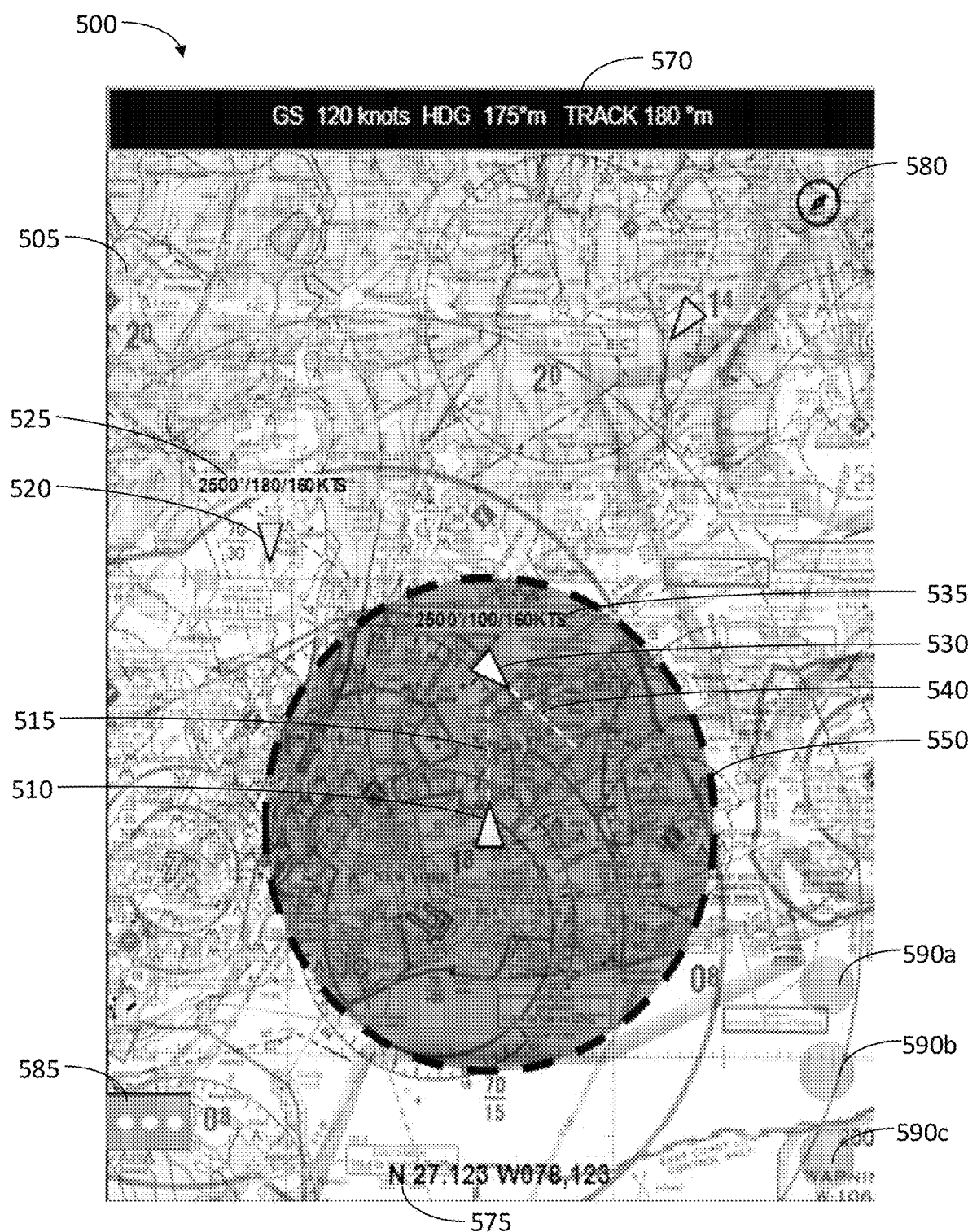
FIG. 5 is an example user interface for depicting air traffic within a predetermined radius of a first aircraft on an air traffic map, according to some embodiments.

FIG. 5 illustrates a second example user interface 500 generated by the system 100 of FIG. 1 or the system 200 of FIG. 2. The user interface includes a map 505 representing a travel area. A first graphical representation 510 of a first aircraft may be displayed on the user interface 500, superimposed over the map 505. The first graphical representation 510 and any other graphical representation may be a representation provided on the user interface 500 of an object within the travel area. A generic graphical representation may have characteristics that identify a corresponding object. The generic graphical representation may be an icon, a shape, or a picture that represents a type of object. For example, the generic graphical representation may be a triangle when representing an aircraft. The generic graphical representation may also have other characteristics such as a size or a color that correspond to the object. For example, the generic graphical representation may change color based on distance from the first aircraft. In some embodiments, the first aircraft is an ownship (i.e., the first aircraft is operated by a user of the user interface 500). In some embodiments, the first graphical representation 510 may include a first directional line 515 indicating a projected path of the first aircraft.

The user interface 500 may also include a second graphical representation 520 of a second aircraft. The second graphical representation 520 may be a different color than the first graphical representation 510. The second graphical representation 520 may include navigational information of the second aircraft 525. The navigational information of the second aircraft 525 may include an altitude of the second aircraft, a heading of the second aircraft, and/or a speed of the second aircraft. In different embodiments, no graphical representations, some graphical representations, or all graphical representations may include navigational information. In some embodiments, the user interface 500 may be configured to generate navigational information about an aircraft in response to a selection of the corresponding graphical representation.

The user interface 500 may include a third graphical representation 530 of a third aircraft. The third graphical representation 530 may be a different color than the first graphical representation 510 and the second graphical representation 520. The third graphical representation 530 may include navigational information 535 of the third aircraft. The navigational information of the third aircraft 535 may include an altitude of the third aircraft, a heading of the third aircraft, and/or a speed of the third aircraft. The third graphical representation 530 further includes a second directional line 540 indicating an anticipated flight path of the third aircraft. As illustrated by FIG. 5, the third aircraft has entered within a predetermined radius of the first aircraft (e.g., 2.5 nautical miles), represented by the third graphical representation 530 being within a predetermined radius of the first graphical representation 510. In response to receiving a signal that the third aircraft has entered within the predetermined radius of the first aircraft, the user interface 500 generates a highlighted geometric area 550 representing the predetermined radius, and configured to highlight the first graphical representation 510 and the third graphical representation 530. To facilitate this highlighting, the highlighted geometric area 550 may be presented using a semi-transparent shading (for example, using a darker or different color relative to the non-highlighted portions of the map 505), to allow a user of the user interface 500 to see the map 505 behind the highlighted geometric area 550. In some embodiments, the highlighted geometric area 550 is produced by fading the background of the map 505 within the highlighted geometric area 550 such that the first graphical representation 510 and the third graphical representation 530 are predominantly visible within the highlighted geometric area 550. In some embodiments, the highlighted geometric area 550 is a circle. In other embodiments, the highlighted geometric area 550 may be an ellipse, a triangle, or another shape. The shape of the highlighted geometric area 550 may be based on a type of the first aircraft 510 or a speed of the first aircraft 510.

The user interface 500 may also include navigational information of the first aircraft 570. The navigational information of the first aircraft 570 may include an altitude of the first aircraft, a heading of the first aircraft, and/or a speed of the first aircraft. The user interface 500 may also include coordinate data of the first aircraft 575. The coordinate data of the first aircraft 575 may represent a current position of the first aircraft. The user interface 500 may also include a compass 580. The user interface 500 may also include a menu button 585. In some embodiments, the menu button 585 may provide the user with one or more additional functionalities of the user interface 500. The user interface 500 may also include one or more zoom buttons 590a-590c. In some embodiments, the zoom buttons 590a-590c may be used to adjust (i.e., incrementally increase or decrease) a zoom level of the map 505. For example, a first zoom button 590a may increase a zoom level of the map 505, a second zoom button 590b may return the map 505 to a predetermined zoom level, and a third zoom button 590c may decrease a zoom level of the map 505. In other embodiments, the zoom buttons 590a-590c may be used to set a zoom level of the map 505 to different predetermined levels. For example, the first zoom button 590a may set the zoom level of the map 505 to a first predetermined zoom level, the second zoom button 590b may set the zoom level of the map 505 to a second predetermined zoom level, and the third zoom button 590c may set the zoom level of the map 505 to a third predetermined zoom level.

Figure 6:
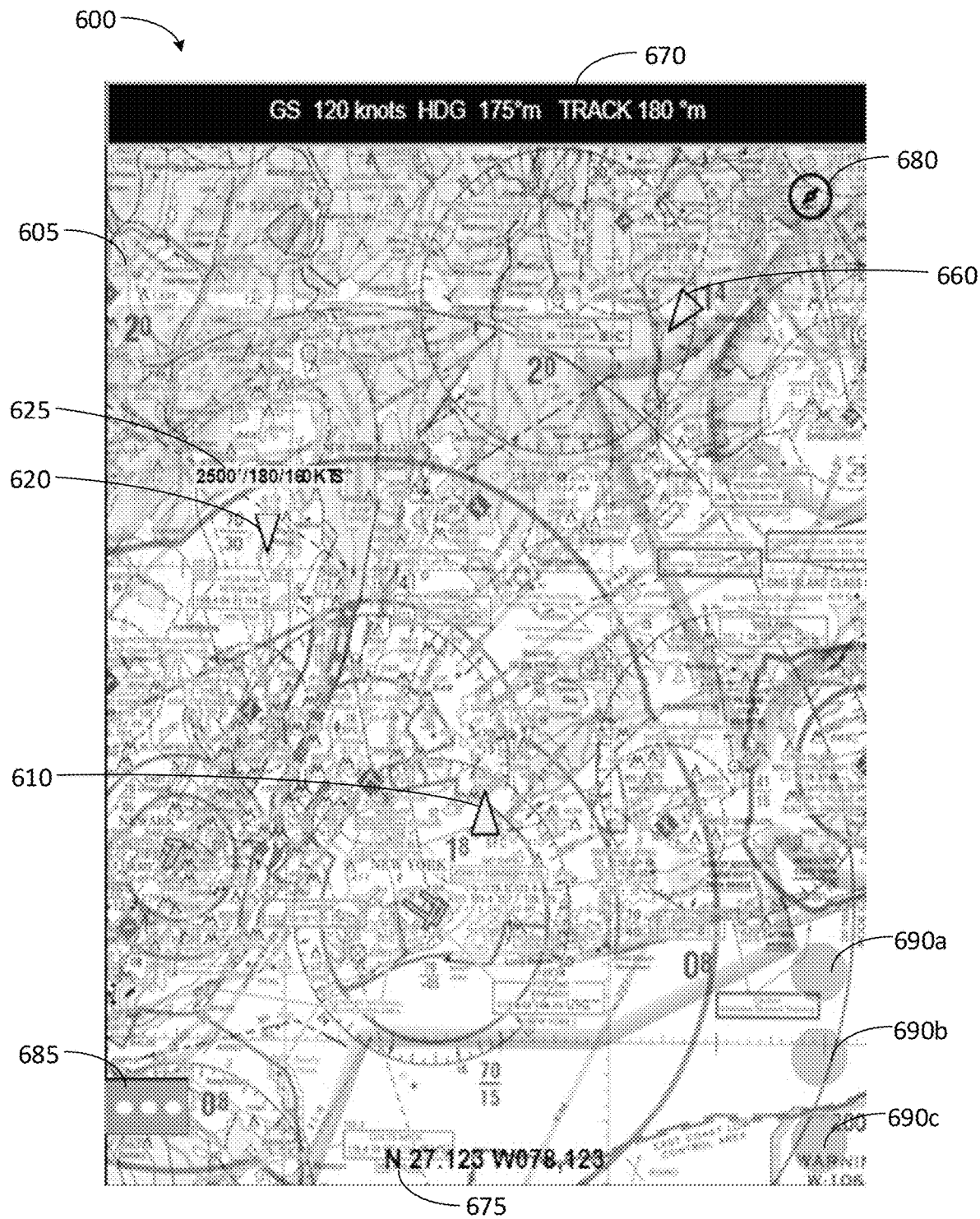
FIG. 6 is an example user interface for depicting air traffic following a loss of an aircraft communication signal on an air traffic map, according to some embodiments.

FIG. 6 illustrates a third example user interface 600 generated by the system 100 of FIG. 1 or the system 200 of FIG. 2. The user interface includes a map 605 representing a travel area. A first graphical representation 610 of a first aircraft may be displayed on the user interface 600, superimposed over the map 605. The first graphical representation 610 and any other graphical representation may be a representation provided on the user interface 600 of an object within the travel area. A generic graphical representation may have characteristics that identify a corresponding object. The generic graphical representation may be an icon, a shape, or a picture that represents a type of object. For example, the generic graphical representation may be a triangle when representing an aircraft. The generic graphical representation may also have other characteristics such as a size or a color that correspond to the object. For example, the generic graphical representation may change color based on distance from the first aircraft. In some embodiments, the first aircraft is an ownship (i.e., an aircraft on which the user interface 600).

The user interface 600 may also include a second graphical representation 620 of a second aircraft. The second graphical representation 620 may be a different color than the first graphical representation 610. The second graphical representation 620 may include navigational information of the second aircraft 625. The navigational information of the second aircraft 625 may include an altitude of the second aircraft, a heading of the second aircraft, and/or a speed of the second aircraft. In different embodiments, no graphical representations, some graphical representations, or all graphical representations may include navigational information. In some embodiments, the user interface 600 may be configured to generate navigational information about an aircraft in response to a selection of the corresponding graphical representation.

The user interface 600 may also include a third graphical representation 660 of a third aircraft. The third graphical representation 660 may be a different color than the first graphical representation 610, and the same color as the second graphical representation 620. As can be seen in the embodiment illustrated in FIG. 6, the third graphical representation 660 does not include navigational information of the third aircraft. The user interface 600 may be configured to transform a property of the third graphical representation 660 based on a condition associated with the third aircraft. For example, in some embodiments, the user interface 600 may be configured to reduce an opacity of the third graphical representation 660 in response to a loss of a communication signal indicating a position of the third aircraft. In some embodiments, the opacity of the third graphical representation 660 may be reduced based on a linear function of time since the communication signal was lost, or an "age" of the last received communication signal (e.g., the opacity of the third graphical representation 660 may be 100% before a communication signal loss, 50% at 30 seconds from the communication signal loss, and 0% at 60 seconds from the communication signal loss). In some embodiments, the third graphical representation 660 may continue to move along a projected path of the third aircraft. In some embodiments, a different function, such as an exponential function, a quadratic function, a rational function, a root function, a power function, a parabolic function, a hyperbolic function, a logarithmic function, or a trigonometric function may be used to transform the property. In some embodiments, a different property of the third graphical representation 660, such as a size, a shape, a color, and/or an appended text may be transformed.

The user interface 600 may also include navigational information of the first aircraft 670. The navigational information of the first aircraft 670 may include an altitude of the first aircraft, a heading of the first aircraft, and/or a speed of the first aircraft. The user interface 600 may also include coordinate data of the first aircraft 675. The coordinate data of the first aircraft 675 may represent a current position of the first aircraft. The user interface 600 may also include a compass 680. The user interface 600 may also include a menu button 685. In some embodiments, the menu button 685 may provide the user with one or more additional functionalities of the user interface 600. The user interface

600 may also include one or more zoom buttons 690a-690c. In some embodiments, the zoom buttons 690a-690c may be used to adjust (i.e., incrementally increase or decrease) a zoom level of the map 605. For example, a first zoom button 690a may increase a zoom level of the map 605, a second zoom button 690b may return the map 605 to a predetermined zoom level, and a third zoom button 690c may decrease a zoom level of the map 605. In other embodiments, the zoom buttons 690a-690c may be used to set a zoom level of the map 605 to different predetermined levels. For example, the first zoom button 690a may set the zoom level of the map 605 to a first predetermined zoom level, the second zoom button 690b may set the zoom level of the map 605 to a second predetermined zoom level, and the third zoom button 690c may set the zoom level of the map 605 to a third predetermined zoom level.

Figure 7:
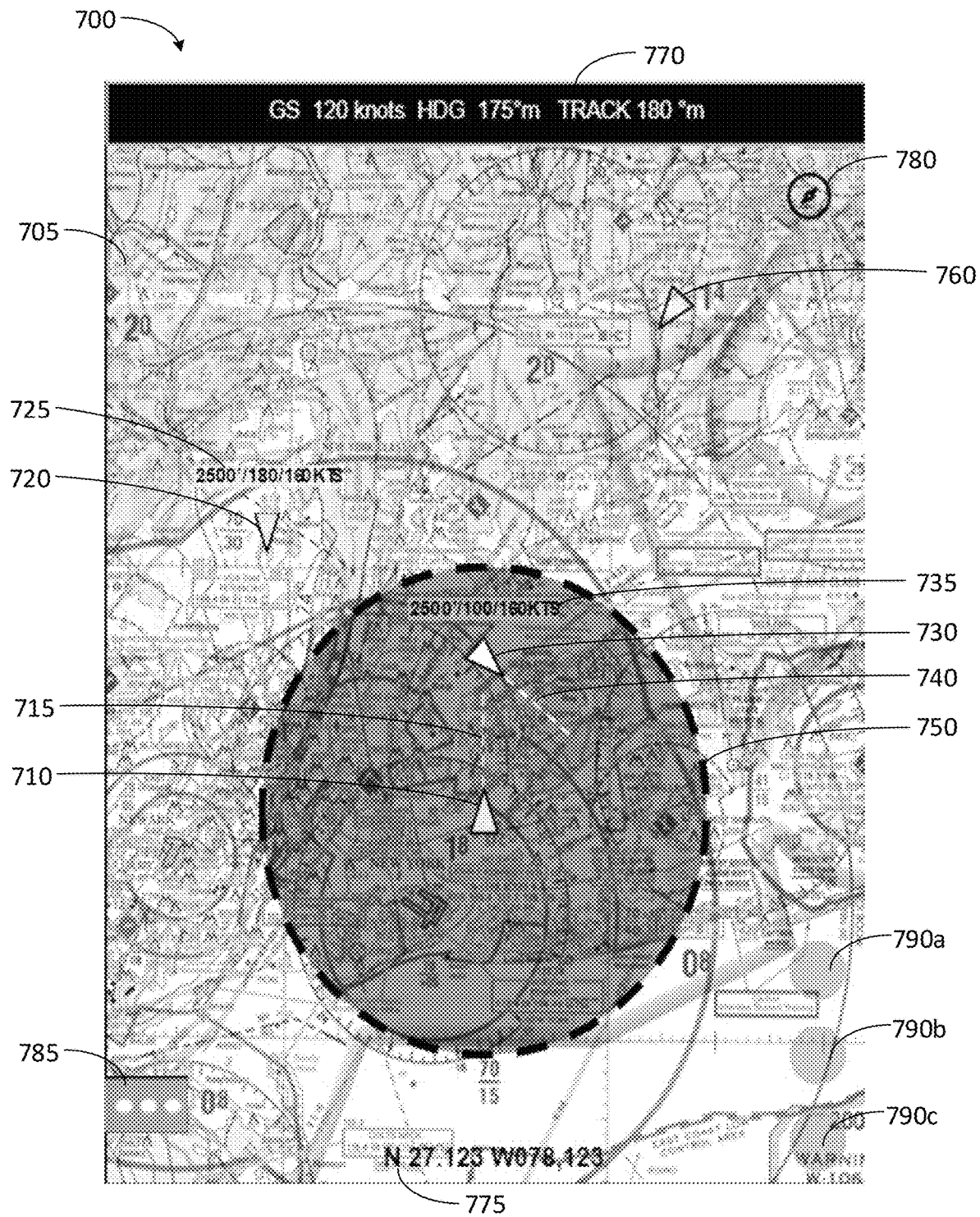
FIG. 7 is an example user interface for depicting air traffic within a predetermined radius of a first aircraft and following a loss of an aircraft communication signal on an air traffic map, according to some embodiments.

FIG. 7 illustrates a fourth example user interface 700 generated by the system 100 of FIG. 1 or the system 200 of FIG. 2. The user interface includes a map 705 representing a travel area. A first graphical representation 710 of a first aircraft may be displayed on the user interface 700, superimposed over the map 705. The first graphical representation 710 and any other graphical representation may be a representation provided on the user interface 700 of an object within the travel area. A generic graphical representation may have characteristics that identify a corresponding object. The generic graphical representation may be an icon, a shape, or a picture that represents a type of object. For example, the generic graphical representation may be a triangle when representing an aircraft. The generic graphical representation may also have other characteristics such as a size or a color that correspond to the object. For example, the generic graphical representation may change color based on distance from the first aircraft. In some embodiments, the first aircraft is an ownship (i.e., the first aircraft is operated by a user of the user interface 700). In some embodiments, the first graphical representation 710 may include a first directional line 715 indicating a projected path of the first aircraft.

The user interface 700 may also include a second graphical representation 720 of a second aircraft. The second graphical representation 720 may be a different color than the first graphical representation 710. The second graphical representation 720 may include navigational information of the second aircraft 725. The navigational information of the second aircraft 725 may include an altitude of the second aircraft, a heading of the second aircraft, and/or a speed of the second aircraft. In different embodiments, no graphical representations, some graphical representations, or all graphical representations may include navigational information. In some embodiments, the user interface 700 may be configured to generate navigational information about an aircraft in response to a selection of the corresponding graphical representation.

The user interface 700 may include a third graphical representation 730 of a third aircraft. The third graphical representation 730 may be a different color than the first graphical representation 710 and the second graphical representation 720. The third graphical representation 730 may include navigational information 735 of the third aircraft. The navigational information of the third aircraft 735 may include an altitude of the third aircraft, a heading of the third aircraft, and/or a speed of the third aircraft. The third graphical representation 730 further includes a second directional line 740 indicating an anticipated flight path of the third aircraft. As illustrated by FIG. 7, the third aircraft has entered within a predetermined radius of the first aircraft (e.g., 2.5 nautical miles), represented by the third graphical representation 730 being within a predetermined radius of the first graphical representation 710. In response to receiving a signal that the third aircraft has entered within the predetermined radius of the first aircraft, the user interface 700 generates a highlighted geometric area 750 representing the predetermined radius, and configured to highlight the first graphical representation 710 and the third graphical representation 730. In some embodiments, to facilitate this highlighting, the highlighted geometric area 750 may be presented using a semi-transparent shading (for example, using a darker or different color relative to the non-highlighted portions of the map 705), which allows a user of the user interface 700 to see the map 705 behind the highlighted geometric area 750. In some embodiments, the highlighted geometric area 750 is produced by fading the background of the map 705 within the highlighted geometric area 750 such that the first graphical representation 710 and the third graphical representation 730 are predominantly visible within the highlighted geometric area 750. In some embodiments, the highlighted geometric area 750 is a circle. In other embodiments, the highlighted geometric area 750 may be an ellipse, a triangle, or another shape. The shape of the highlighted geometric area 750 may be based on a type of the first aircraft 710 or a speed of the first aircraft 710.

The user interface 700 may also include a fourth graphical representation 760 of a fourth aircraft. The fourth graphical representation 760 may be a different color than the first graphical representation 710 and the third graphical representation 730, and the same color as the second graphical representation 720. As can be seen in the embodiment illustrated in FIG. 7, the fourth graphical representation 760 does not include navigational information of the fourth aircraft. The user interface 700 may be configured to transform a property of the fourth graphical representation 760 based on a condition associated with the fourth aircraft. For example, in some embodiments, the user interface 700 may be configured to reduce an opacity of the fourth graphical representation 760 in response to a loss of a communication signal indicating a position of the fourth aircraft. In some embodiments, the opacity of the fourth graphical representation 760 may be reduced based on a linear function of time since the communication signal was lost, or an "age" of the last received communication signal (e.g., the opacity of the fourth graphical representation 760 may be 100% before a communication signal loss, 50% at 30 seconds from the communication signal loss, and 0% at 70 seconds from the communication signal loss). In some embodiments, the fourth graphical representation 760 may continue to move along a projected path of the fourth aircraft. In some embodiments, a different function, such as an exponential function, a quadratic function, a rational function, a root function, a power function, a parabolic function, a hyperbolic function, a logarithmic function, or a trigonometric function may be used to transform the property. In some embodiments, a different property of the fourth graphical representation 760, such as a size, a shape, a color, and/or an appended text may be transformed.

The user interface 700 may also include navigational information of the first aircraft 770. The navigational information of the first aircraft 770 may include an altitude of the first aircraft, a heading of the first aircraft, and/or a speed of the first aircraft. The user interface 700 may also include coordinate data of the first aircraft 775. The coordinate data of the first aircraft 775 may represent a current position of the first aircraft. The user interface 700 may also include a compass 780. The user interface 700 may also include a menu button 785. In some embodiments, the menu button 785 may provide the user with one or more additional functionalities of the user interface 700. The user interface 700 may also include one or more zoom buttons 790a-790c. In some embodiments, the zoom buttons 790a-790c may be used to incrementally adjust (i.e., incrementally increase or decrease) a zoom level of the map 705. For example, a first zoom button 790a may increase a zoom level of the map 705, a second zoom button 790b may return the map 705 to a predetermined zoom level, and a third zoom button 790c may decrease a zoom level of the map 705. In other embodiments, the zoom buttons 790a-790c may be used to set a zoom level of the map 705 to different predetermined levels. For example, the first zoom button 790a may set the zoom level of the map 705 to a first predetermined zoom level, the second zoom button 790b may set the zoom level of the map 705 to a second predetermined zoom level, and the third zoom button 790c may set the zoom level of the map 705 to a third predetermined zoom level.

Figure 8:
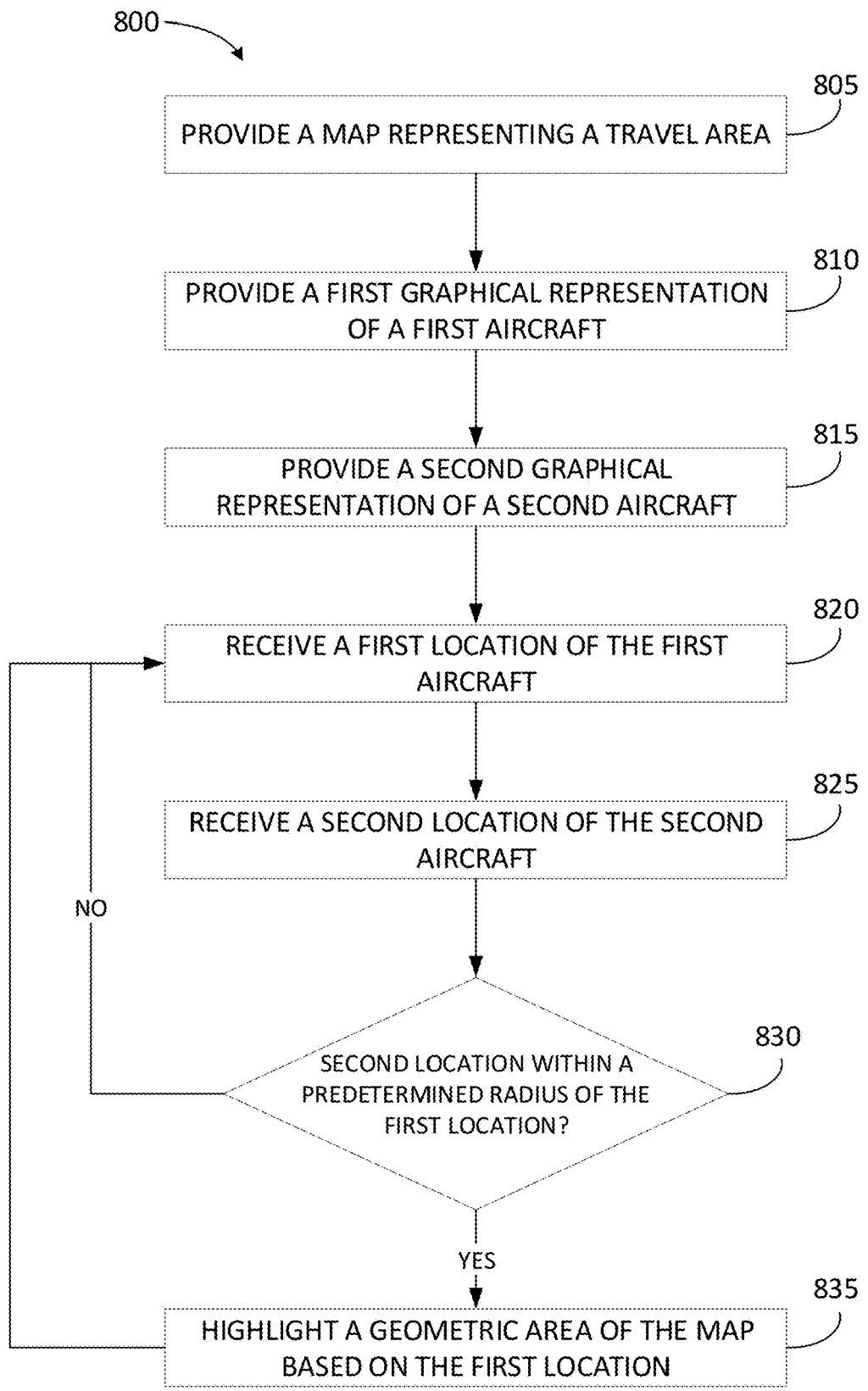
FIG. 8 is a flowchart illustrating a method of highlighting an area of an air traffic map, according to some embodiments.

FIG. 8 is a flowchart illustrating a method 800 for highlighting a geometric area of a user interface. The method 800 may be implemented on the system 100 of FIG. 1, the system 200 of FIG. 2, and/or a different system. The method 800 may be executed on one or more processors to generate a user interface according to embodiments described herein. The method 800 includes providing a map of a travel area (at block 805). The travel area may be the travel area of a first aircraft. The map may be configured to move based on a position of the first aircraft. For example, the map may represent a fixed-size area around the first aircraft, and the map may change an area encompassed by the fixed-size area as the first aircraft moves through real space. The method further includes providing, on the map, a first graphical representation of the first aircraft (at block 810). The first graphical representation may represent a position of the first aircraft relative to the travel area, illustrated relative to the map. The method further includes providing, on the map, a second graphical representation of a second aircraft (at block 815). The second graphical representation may represent a position of the second aircraft relative to the travel area, illustrated relative to the map.

At block 820, the method 800 includes receiving a first location of the first aircraft. The system implementing the method 800 may receive the first location from a transceiver of the first aircraft, a control tower, a satellite, and/or some other source. At block 825, the method 800 includes receiving a second location of the second aircraft. The system implementing the method 800 may receive the second location from a transceiver of the second aircraft, a control tower, a satellite, and/or some other source. The method 800 further includes determining whether the second location of the second aircraft is within a predetermined radius of the first location of the first aircraft (at block 830). This determination can be made by the electronic processor executing the method 800, a comparator, or by some other means. If the second aircraft is within the predetermined radius of the first aircraft, the method 800 includes highlighting a geometric area of the map based on the first location (at block 835). For example, the user interface may generate a darkened, semi-transparent circle around the first graphical representation, wherein the radius of the circle represents the first predetermined radius of the first aircraft. The highlighted area may allow quick identification of the first graphical representation and the second graphical representation by contrasting with the map. The geometric area may remain highlighted until the second aircraft is no longer within the predetermined radius of the first aircraft. The method 800 then returns to block 820. Returning to block 830, if the second aircraft is not within the predetermined radius of the first aircraft, the method 800 returns to block 820. In some embodiments, the geometric area is not highlighted when the second aircraft is within the predetermined radius of the first aircraft and a special condition is met. For example, the geometric area may not be highlighted when the first aircraft is within an area with an expected heightened amount of traffic, such as an airport.

Figure 9:
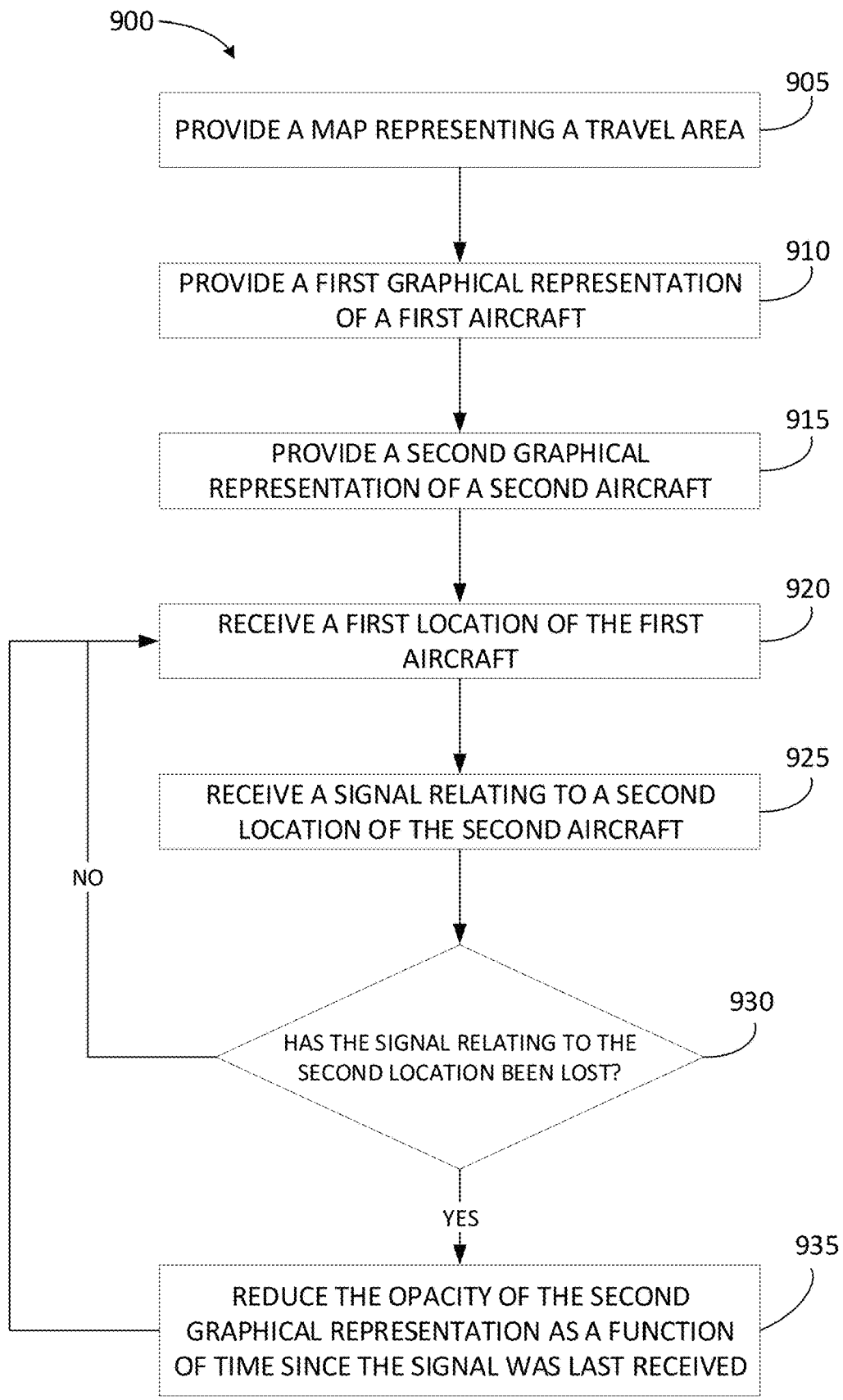
FIG. 9 is a flowchart illustrating a method of depicting an aircraft on an air traffic map following a loss of a communication signal from the aircraft, according to some embodiments.

FIG. 9 is a flowchart illustrating a method 900 for indicating that a communication signal corresponding to a second aircraft has been lost. The method 900 may be implemented on the system 100 of FIG. 1, the system 200 of FIG. 2, and/or a different system. The method 900 may be executed on one or more processors to generate a user interface according to embodiments described herein. The method 900 includes providing a map of a travel area (at block 905). The travel area may be the travel area of a first aircraft. The map may be configured to move based on a position of the first aircraft. The method further includes providing, on the map, a first graphical representation of the first aircraft (at block 910). The first graphical representation may represent a position of the first aircraft relative to the travel area, illustrated relative to the map. The method further includes providing, on the map, a second graphical representation of the second aircraft (at block 915). The second graphical representation may represent a position of the second aircraft relative to the travel area, illustrated relative to the map.

At block 920, the method 900 includes receiving a first location of the first aircraft. The system implementing the method 900 may receive the first location from a transceiver of the first aircraft, a control tower, a satellite, and/or some other source. At block 925, the method 900 includes receiving a second location of the second aircraft. The system implementing the method 900 may receive the second location from a transceiver of the second aircraft, a control tower, a satellite, and/or some other source. The method 900 further includes determining whether the communication signal indicating the position of the second aircraft is still being received (at block 930). If the communication signal is no longer being received, the communication signal is considered "lost." The communication signal may be lost by the second aircraft moving out of a range of the first aircraft, a transceiver of either the first aircraft or second aircraft is no longer functioning, or for some other reason. If the communication signal relating to the second location has been lost, the method 900 further includes transforming a property of the second graphical representation to indicate a time since the communication signal was lost. For example, an opacity of the second graphical representation may be decreased as a function of time since the communication signal was last received (at block 935). The method 900 then returns to block 920. Returning to block 930, if the signal relating to the second aircraft is not lost, the method 900 returns to block 920.

Therefore, embodiments described herein provide systems and methods for detecting traffic aircraft and displaying these traffic aircraft to an operator of an aircraft via an enhanced aircraft traffic interface. The enhanced aircraft traffic interface may allow for the operator of the aircraft to quickly and efficiently identify traffic aircraft within a vicinity of the aircraft, which enhances safe operations of the aircraft.

The graphical user interfaces provided herein provide improved user interfaces to, among other things, EFB systems. The improved user interface provides pilots with important flight data and control capabilities though a single interface, resulting in less systems needing to be accessed. This reduces the user interactions required to access necessary data, improves pilot situational awareness, and provides more efficient operation of the aircraft because, among other things, aircraft traffic displays do not have to be manually adjusted based on aircraft entering into and leaving the vicinity of the ownship.

Various features and advantages of some embodiments are set forth in the following claims.

What is claimed is:

1. A method of depicting aircraft traffic on an electronic display, the method comprising:
providing on the electronic display, with an electronic processor, a map representing a travel area;
providing on the map, with the electronic processor, a first graphical representation of a first aircraft within the travel area;
providing on the map, with the electronic processor, a second graphical representation of a second aircraft within the travel area;
receiving, with the electronic processor, a first location of the first aircraft;
receiving, with the electronic processor, a second location of the second aircraft; and,
in response to determining that the second location is within a predetermined radius of the first location, highlighting, with the electronic processor, a geometric area of the map based on the first location,
wherein the second location of the second aircraft is based on a first received communication signal, and
wherein the predetermined radius is a first predetermined radius, and within a second predetermined radius of the first location, the second predetermined radius being larger than the first predetermined radius,
wherein the method further comprises:
providing on the map, with the electronic processor, a third graphical representation of a third aircraft within the travel area;
receiving, with the electronic processor, a third location of the third aircraft based on a second received communication signal; and
in response to losing the second received communication signal, gradually transforming on the map, with the electronic processor, an opacity of the third graphical representation based on a time since the second received communication signal was lost.

2. The method of claim 1, wherein the geometric area is semi-transparent.

3. The method of claim 1, wherein the geometric area represents an area within the predetermined radius of the first location.

4. The method of claim 1, wherein the second graphical representation comprises data relating to at least one selected from a group of an altitude of the second aircraft, a heading of the second aircraft, and a speed of the second aircraft.

5. The method of claim 4, wherein the second graphical representation further comprises an anticipated flight path of the second aircraft.

6. The method of claim 1, wherein the first aircraft is a helicopter and the predetermined radius is 2.5 nautical miles.

7. The method of claim 1, further comprising:
providing on the electronic display, with the electronic processor, at least one button for adjusting a zoom level of the map; and
providing on the electronic display, with the electronic processor, a compass.

8. The method of claim 1, wherein gradually transforming the opacity of the third graphical representation based on a time since the second received communication signal was lost includes reducing the opacity as the time increases.

9. A graphical user interface comprising:
a map representing a travel area;
a first graphical representation of a first aircraft within the travel area, the first graphical representation displayed on the map;
a second graphical representation of a second aircraft within the travel area, the second graphical representation displayed on the map; and
a highlighted geometric area based on a first location of the first aircraft, the highlighted geometric area displayed on the map;
wherein the highlighted geometric area is displayed on the map when a second location of the second aircraft is determined to be within a predetermined radius of the first location, and
wherein the graphical user interface further comprises:
a third graphical representation of a third aircraft within the travel area, the third graphical representation displayed on the map;
wherein an opacity of the third graphical representation is gradually transformed based on a time since a received communication signal from the third aircraft was lost.

10. The graphical user interface of claim 9, wherein the geometric area is semi-transparent.

11. The graphical user interface of claim 9, wherein the geometric area represents an area within the predetermined radius of the first location.

12. The graphical user interface of claim 9, wherein the second graphical representation comprises data relating to at least one selected from a group of an altitude of the second aircraft, a heading of the second aircraft, and a speed of the second aircraft.

13. The graphical user interface of claim 9, wherein the opacity of the third graphical representation is gradually transformed based on an age of the third graphical representation by reducing the opacity as the age increases.

14. A system for depicting traffic on a traffic interface, the system comprising:
an electronic controller including an electronic processor;
a display for displaying the traffic interface, the display communicatively coupled to the controller;
a transceiver communicatively coupled to the controller; and
an electronic controller configured to:
provide, on the traffic interface, a map representing a travel area;
provide, on the map, a first graphical representation of a first aircraft within the travel area;
provide, on the map, a second graphical representation of a second aircraft within the travel area;
receive, from the transceiver, a first location of the first aircraft;
receive, from the transceiver, a second location of the second aircraft;
in response to determining that the second location is within a predetermined radius of the first location, transform the traffic interface to highlight a geometric area of the map based on the first location,
provide, on the map, a third graphical representation of a third aircraft within the travel area; and gradually transform, on the map, an opacity of the third graphical representation based on a time since a received communication signal from the third aircraft was lost.

15. The system of claim 14, wherein the geometric area is semi-transparent.

16. The system of claim 14, wherein the geometric area represents an area within the predetermined radius of the first location.

17. The system of claim 14, wherein gradually transforming the opacity of the third graphical representation based on an age of the third graphical representation includes reducing the opacity as the age increases.

\* \* \* \* \*